(12) United States Patent
Fong et al.

(10) Patent No.: US 12,449,142 B2
(45) Date of Patent: Oct. 21, 2025

(54) ADSORPTION RADIANT AIR-CONDITIONING SYSTEM COMPRISING VACUUM DEHUMIDIFICATION AND HIGH-TEMPERATURE COOLING

(71) Applicant: City University of Hong Kong, Hong Kong (HK)

(72) Inventors: Kwong Fai Fong, Hong Kong (HK); Chun Kwong Lee, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 47 days.

(21) Appl. No.: 18/407,385

(22) Filed: Jan. 8, 2024

(65) Prior Publication Data
US 2024/0240809 A1    Jul. 18, 2024

Related U.S. Application Data (60) Provisional application No. 63/479,736, filed on Jan. 13, 2023.

(51) Int. Cl.
*F24F 3/14* (2006.01)
*B01D 53/04* (2006.01)
*B01D 53/26* (2006.01)

(52) U.S. Cl.
CPC ........ *F24F 3/1411* (2013.01); *B01D 53/0438* (2013.01); *B01D 53/265* (2013.01);
(Continued)

(58) Field of Classification Search
CPC ............. F24F 3/1411; F24F 2003/1435; F24F 2003/1446; B01D 53/0438; B01D 53/265;
(Continued)

(56) References Cited

U.S. PATENT DOCUMENTS

| 10,969,124 B2 | 4/2021 | Scovazzo et al. |
| 11,577,193 B2 | 2/2023 | Fong et al. |
| 2023/0243525 A1* | 8/2023 | Fix et al. ............... B01D 71/80 95/52 |

FOREIGN PATENT DOCUMENTS

| CN | 101906800 A | 12/2010 |
| CN | 103282724 A | 9/2013 |

(Continued)

OTHER PUBLICATIONS

K.F. Fong et al., "Comparative study of different solar cooling systems for buildings in subtropical city", Solar Energy, 2010, vol. 84, p. 227-244.
(Continued)

*Primary Examiner* — Jerry-Daryl Fletcher
*Assistant Examiner* — Dario Antonio Deleon
(74) *Attorney, Agent, or Firm* — Idea Intellectual Limited; Sam T. Yip (57) ABSTRACT

An integrated adsorption cooling and vacuum dehumidification system (IAdCVD) is provided, including a vacuum section, an evaporator, an adsorption chamber, a condenser, a desorption chamber, and a MCV and an expansion valve. The vacuum section comprises a selective (say hydrophilic) membrane. The evaporator is connected to a low-pressure side to establish a water vapor pressure difference across the selective membrane. The adsorption chamber communicates with the evaporator. The desorption chamber communicates with the condenser. The condenser is configured to convert the water vapor migrated from the desorption chamber into a condensed water. The condensed water in the condenser is directed to the evaporator by passing through the MCV and the expansion valve in sequence, and the condensed water directed to the evaporator enters the evaporator via a first
(Continued)

port different from a second port for connecting the evaporator to a chilled water supply.

19 Claims, 8 Drawing Sheets

(52) U.S. Cl.
CPC .................... *B01D 2257/80* (2013.01); *B01D 2259/40092* (2013.01); *F24F 2003/1435* (2013.01); *F24F 2003/1446* (2013.01)

(58) Field of Classification Search
CPC ...... B01D 2257/80; B01D 2259/40092; B01D 53/268
See application file for complete search history.

(56) References Cited

FOREIGN PATENT DOCUMENTS

| CN | 107036192 A | 8/2017 |
|---|---|---|
| CN | 109262778 A | 1/2019 |
| CN | 111013342 A | 4/2020 |
| CN | 111412736 A | 7/2020 |
| JP | S63220026 A | 9/1988 |
| JP | H0282034 A | 3/1990 |
| WO | 2019062443 A1 | 4/2019 |

OTHER PUBLICATIONS

Sanjay Kumar et al., "Ten questions concerning smart and healthy built environments for older adults", Building and Environment, 2023, vol. 224, No. 110720, p. 1-17.
K.F. Fong et al., "Investigation on solar hybrid desiccant cooling system for commercial premises with high latent cooling load in subtropical Hong Kong", Applied Thermal Engineering, 2011, vol. 31, p. 3393-3401.
K.F. Fong et al., "Solar hybrid air-conditioning system for high temperature cooling in subtropical city", Renewable Energy, 2010, vol. 35, p. 2439-2451.
Ming Qu et al., "Isothermal membrane-based air dehumidification: A comprehensive review", Renewable and Sustainable Energy Reviews, 2018, vol. 82, p. 4060-4069.
Seong-Yong Cheon et al., "Experimental study of vacuum-based membrane dehumidifier for HVAC system: Parametric analysis and dehumidification performance", Energy Conversion and Management, 2022, vol. 270, No. 116252, p. 1-14.
Liang Chun et al., "Research on thermodynamic performance of a novel building cooling system integrating dew point evaporative cooling, air-carrying energy radiant air conditioning and vacuum membrane-based dehumidification (DAV—cooling system)", Energy Conversion and Management, 2021, vol. 245, No. 114551, p. 1-15.
Hyunjeong Lim et al., "Comparative thermodynamic analysis of membrane-based vacuum air dehumidification systems", Applied Thermal Engineering, 2020, vol. 179, No. 115676, p. 1-13.
Zohreh Rahimi-Ahar et al., "Comprehensive study on vacuum humidification-dehumidification (VHDH) desalination", Applied Thermal Engineering, 2020, vol. 169, No. 114944, p. 1-12.
Hye-Jin Cho et al., "Energy impact of vacuum-based membrane dehumidification in building air-conditioning applications", Applied Thermal Engineering, 2021, vol. 182, No. 116094, p. 1-14.
Paul Scovazzo et al., "Membrane module design, construction, and testing for vacuum sweep dehumidification (VSD): Part I, prototype development and module design", Journal of Membrane Science, 2019, vol. 576, p. 96-107.
Paul Scovazzo et al., "Isothermal dehumidification or gas drying using vacuum sweep dehumidification", Applied Thermal Engineering, 2013, vol. 50, p. 225-233.
Ahmad A. Bukshaisha et al., "Simulation of membrane heat pump system performance for space cooling", International Journal of Refrigeration, 2019, vol. 99, p. 371-381.
Jungchul Kim et al., "Analytic approach to analyzing the performance of membrane dehumidification by pervaporation", Journal of Mechanical Science and Technology, 2019, vol. 33, p. 2979-2984.
Gilbong Lee et al., "Performance estimation of membrane dehumidification based on heat exchanger analogy approaches using E-NTU model", International Journal of Low-Carbon Technologies, 2020, vol. 15, p. 299-307.
Jie Lin et al., "Investigation of dew point evaporative cooling with vacuum membrane dehumidification", Energy Procedia, 2017, vol. 142, p. 3851-3856.
Duc Thuan Bui et al., "A thermodynamic perspective to study energy performance of vacuum-based membrane dehumidification", Energy, 2017, vol. 132, p. 106-115.
T.D. Bui et al., "On the theoretical and experimental energy efficiency analyses of a vacuum-based dehumidification membrane", Journal of Membrane Science, 2017, vol. 539, p. 76-87.
Ka Chung Chan et al., "Experiment verified simulation study of the operating sequences on the performance of adsorption cooling system", Building Simulation, 2015, vol. 8, No. 3, p. 255-269.
Akiyoshi Sakoda et al., "Fundamental study on solar powered adsorption cooling system", Journal of Chemical Engineering of Japan, 1984, vol. 17, No. 1, p. 52-57.
Hyunjeong Lim et al., "Performance simulation of membrane heat pumps based on vacuumdehumidification system", Journal of Mechanical Science and Technology, 2020, vol. 34, p. 941-948.

* cited by examiner

ADSORPTION RADIANT AIR-CONDITIONING SYSTEM COMPRISING VACUUM DEHUMIDIFICATION AND HIGH-TEMPERATURE COOLING

FIELD OF THE INVENTION

The present invention generally relates to an air-conditioning system, and more particularly, to an adsorption radiant air-conditioning system comprising vacuum dehumidification and high-temperature cooling.

BACKGROUND OF THE INVENTION

In recent years, the extreme weather has highlighted the threat of global warming worldwide. In particular, it is expected that the situation will only worsen in the future if no action is taken. To address this, the quest for carbon neutrality is crucial. Shifting from conventional electricity-driven air-conditioning systems to solar thermal cooling systems proves to be effective, as air-conditioning systems traditionally contribute significantly to building electricity demand. The utilization of waste heat further enhances the benefits of thermal cooling systems in reducing carbon emissions. Additionally, the adoption of more energy-efficient radiant cooling increases the potential towards achieving carbon neutrality. One approach involves transitioning from conventional electricity-driven vapor-compression systems to thermal cooling systems powered by solar energy or waste heat. Solar cooling systems have been utilized for decades, and various publications discuss their performance in different climatic conditions and building applications. Research suggests that the coefficient of performance (COP) is a key parameter influencing the technical, environmental, and economic feasibilities of a solar cooling system. Therefore, any method capable of improving the system COP is beneficial.

Complicating matters, independent temperature and humidity control may be necessary in certain building applications and for occupants' well-being. High humidity levels can lead to respiratory issues, while low humidity levels may result in dry skin and respiratory irritation. Hence, finding ways to enhance the situation is essential. To address the problem, a related work proposed separate handling of sensible and latent loads using a vapor-compression chiller combined with a solar-driven solid desiccant dehumidification system. High-temperature radiant cooling has been recognized as an energy-efficient air-conditioning method. Since radiant cooling equipment handles only the sensible load of buildings, a dehumidification equipment/system is required to address the latent load, allowing independent control of temperature and humidity. Currently, the most common dehumidification strategy is desiccant dehumidification, whether solid or liquid. A related work considered a fully heat-driven high-temperature cooling system approach using an adsorption chiller and a solid desiccant dehumidification system.

However, one drawback of desiccant dehumidification is that the air tends to be heated during the dehumidification process. Although an evaporative cooler may be used to mitigate this issue, its effectiveness is lower in hot and humid weather. Additionally, solid desiccant dehumidification systems are usually bulky, and liquid desiccant dehumidification systems face problems like carryover of corrosive desiccant solution and a shorter equipment life.

Figure 1:
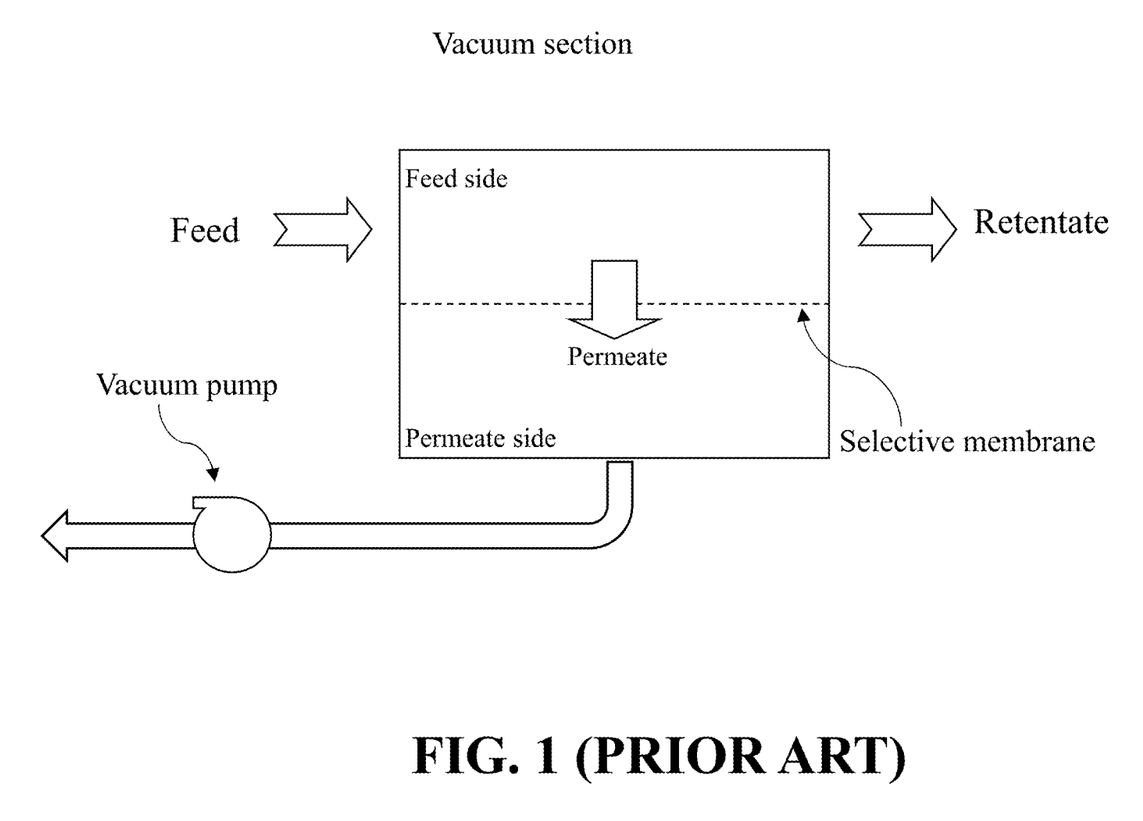
FIG. 1 depicts a schematic diagram of a vacuum dehumidification system driven by an electrical vacuum pump in prior art.

In this regard, vacuum dehumidification (VD) is another option, in which water vapor from a moist air stream is directly extracted through a selective membrane (e.g., hydrophilic) to a low-pressure or vacuum section. Typically, an electrical vacuum pump is used to develop the vacuum, as shown in FIG. 1. In this process, air is introduced into the "feed side" of the selective membrane inside the vacuum section. Water vapor or permeate is transferred to the "permeate side" of the membrane due to the water vapor pressure difference on both sides. The permeate is then extracted by the electrical vacuum pump to the ambient, and the dehumidified air exits the vacuum section as a retentate. Unlike the solid desiccant cooling system, the dehumidification process in vacuum dehumidification is isothermal, resulting in better energy performance compared to desiccant cooling systems.

The concept of vacuum dehumidification using an electrical vacuum pump is well-known. However, the currently employed methods, which use an electric vacuum pump to establish the vacuum space for moisture migration, consume a substantial amount of electricity and generate abundant carbon emissions. Moreover, they tend to be noisy due to the involvement of high-speed vacuum pumps. The energy performance of the vacuum dehumidification system is also highly affected by the efficiency of the vacuum pump.

Therefore, an advanced dehumidification system with sustainable radiant cooling is urgently needed, overcoming challenges in traditional approaches. Such the system is anticipated to serve as a sustainable alternative to conventional vapor-compression systems, contributing significantly to climate change mitigation and providing a more environmentally friendly solution.

SUMMARY OF THE INVENTION

Therefore, the present disclosure provides a heat-driven method/system, which can utilize a heat source from the renewable solar energy or other waste heat source (such as the prime mover of cogeneration, trigeneration or polygeneration). Hence, it helps reduce carbon emissions. Compared with current heat-driven desiccant dehumidification, vacuum dehumidification does not add sensible heat to the air and does not require the use of heat exchanger to reduce the air temperature. Consequently, its system configuration is simpler. The claimed invention offers a complete sustainable solution for the radiant cooling method. Besides, the control of sensible-to-latent load ratio can be more effective by such mean through the regulation of the amount of condensate fed to the evaporator which will be complicated by using the cooling and heating coils in the conventional air-conditioning design.

In accordance to one aspect of the present invention, an integrated adsorption cooling and vacuum dehumidification system (IAdCVD) is provided, including a vacuum section, an evaporator, an adsorption chamber, a condenser, a desorption chamber, and a motorized control valve (MCV) and an expansion valve. The evaporator of the IAdCVD is connected to a vacuum section that comprises a selective (say hydrophilic) membrane separating the vacuum section into a feed side and a low-pressure side, in which the feed side is disposed in contact with an air flow which flows into the vacuum section. The evaporator is connected to the low-pressure side of the vacuum section and has a lower water vapor pressure than that of the feed side such that a water vapor pressure difference is established across the selective membrane, in which the evaporator communicates with a chilled water supply. The adsorption chamber communicates with the evaporator and a cooling water supply, in which the adsorption chamber includes at least one adsorbent and supplied with a cooling agent from the cooling water supply to keep the water vapor pressure of the adsorbent below that of the evaporator so that moisture from the air flow passing through the selective membrane is extracted from the evaporator to the adsorption chamber. The desorption chamber communicates with the condenser and with a hot water supply which is connected to a hot source. The hot water supply is configured to provide heating agent to the desorption chamber to keep vapor pressure of an adsorbent in the desorption chamber higher than that of the condenser so that adsorbed water in the adsorbent in the desorption chamber migrates from the desorption chamber into the condenser. The condenser communicates with a cooling source and is configured to convert the water vapor migrated from the desorption chamber into a condensed water. The MCV and the expansion valve are coupled between the condenser and the evaporator. The condensed water in the condenser is directed to the evaporator by passing through the MCV and the expansion valve in sequence, and the condensed water directed to the evaporator enters the evaporator via a first port different than a second port for connecting the evaporator to the chilled water supply.

In accordance with one aspect of the present invention, a method for using an integrated adsorption cooling and vacuum dehumidification system is provided. The method includes steps as follows: providing a water vapor pressure difference to extract moisture from an air flow passing through a vapor adsorption apparatus which comprises a selective membrane separating the vacuum section into a feed side and a low-pressure side; cooling an adsorption chamber communicating with an evaporator which communicates with the vacuum section, such that the moisture extracted from the feed side through the selective membrane into the evaporator is adsorbed on a surface of an adsorbent of the adsorption chamber; heating a desorption chamber communicating with a condenser to reach a temperature that drives water vapor to migrate into the condenser from the desorption chamber; cooling the condenser communicating with the desorption chamber to a temperature to condense the water vapor migrated from the desorption chamber into the condenser; directing condensed water in the condenser to the evaporator by passing through a MCV and an expansion valve in sequence, wherein the condensed water is directed to the evaporator via a first port, and the evaporator is chilled by a chilled water supply in which chilled water enters the evaporator via a second port different than the first port.

The extracted water vapor from the air stream will be condensed to liquid water through the adsorption refrigeration cycle and collected for other purposes. With the driving heat coming from sustainable means like solar or other waste heat sources, the electricity demand and consequently the carbon emissions can be reduced.

Consequently, a novel heat-driven integrated adsorption cooling and vacuum dehumidification system is proposed. By applying the IAdCVD for radiant cooling, it is found that up to 79 and 44% increase in the system cooling capacity and coefficient of performance (COP) could be reached as compared to an adsorption chiller. This demonstrates the potential of the proposed system as a sustainable alternative to the conventional vapor-compression system against climate change.

BRIEF DESCRIPTION OF THE DRAWINGS

Embodiments of the invention are described in more details hereinafter with reference to the drawings, in which.

DETAILED DESCRIPTION

In the following description, methods and apparatuses for adsorption radiant air-conditioning system comprising vacuum dehumidification and high-temperature cooling and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In the present disclosure, an improved and modified technical solution is provided, which is related to previously filed invention disclosure U.S. Ser. No. 11/577,193B2 that provides air dehumidification by using a heat-driven adsorption refrigeration cycle. This prior art proposes a heat-driven vacuum dehumidification (VD) system which integrates a vacuum section of a VD system into the evaporator of an adsorption chiller (AdC), thus forming an adsorption vacuum dehumidification system (AdVD).

However, if an adsorption refrigeration cycle of the AdVD can be modified to provide high-temperature chilled water simultaneously, a complete heat-driven radiant cooling system can be formed which can provide independent control of temperature and humidity in a sustainable and energy-efficient manner. Hence, it is the intent of the present disclosure to model and analyze performance of such an integrated adsorption cooling and vacuum dehumidification system (IAdCVD) for use in the sub-tropical weather conditions.

Figure 2:
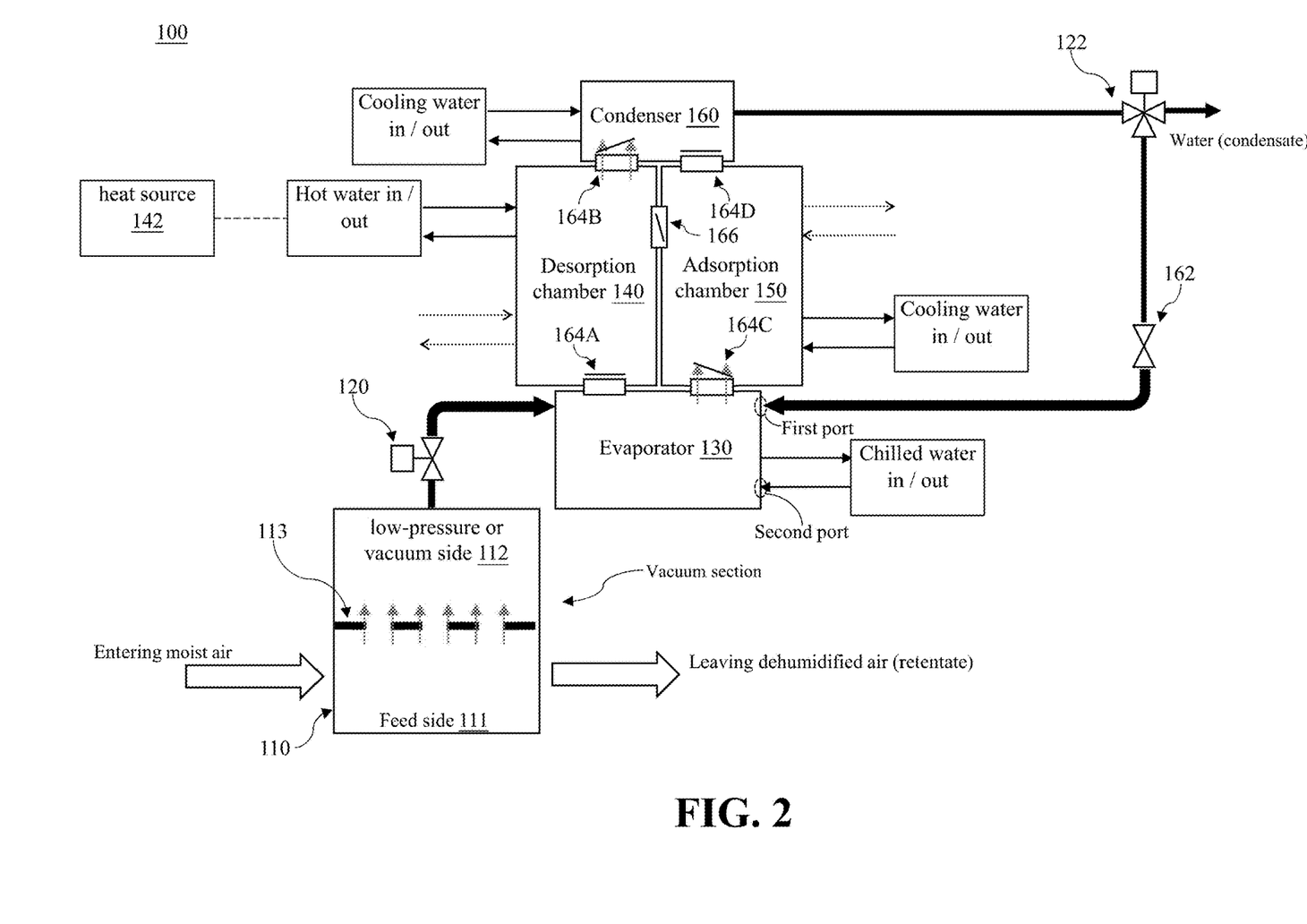
FIG. 2 shows a schematic diagram of an integrated adsorption cooling and vacuum dehumidification system according to one embodiment of the present invention.

Referring to FIG. 2 for the following description. An integrated adsorption cooling and vacuum dehumidification system (IAdCVD) 100 includes a vacuum section 110, a motorized control valve (MCV) 120, 122, an evaporator 130, a desorption chamber 140, an adsorption chamber 150, a condenser 160, an expansion valve 162, on/off valves (OV) 164A, 164B, 164C, 164D, and a transfer valve (TV) 166.

The vacuum section 110 for the IAdCVD 100 includes a feed side 111 and a low-pressure or vacuum side 112, with a selective membrane 113 (e.g., a hydrophilic membrane) serving as a separator between the feed side 111 and the vacuum side 112. Specifically, a water vapor pressure on the feed side 111 is maintained at a higher level than that on the low-pressure or vacuum side 112, creating a distinct water vapor pressure differential across the selective membrane 113. In one embodiment, the vacuum section 110 can be set up or established by using a vapor adsorption apparatus.

The evaporator 130 is in communication with the low-pressure or vacuum side 112 of the vacuum section 110 via the motorized control valve (MCV) 120. In this regard, since the evaporator 130 in communication with the low-pressure or vacuum side 112 has a lower water vapor pressure than that of the feed side 111, a water vapor pressure difference can be established across the selective membrane 113. As such, during the operation, water vapor can be fed from the low-pressure or vacuum side 112 to the evaporator 130 through the MCV 120, in which the MCV 120 is configured to regulate a flow of water vapor between the evaporator 130 and the low-pressure or vacuum side 112 of the vacuum section 110, ensuring precise control of the water vapor pressure difference for optimal system operation.

Further, to establish the water vapor pressure difference, a two-bed adsorption-desorption section including the desorption chamber 140 and the adsorption chamber 150 communicates with the evaporator 130 and the condenser 160. Specifically, the desorption chamber 140 communicates with the evaporator 130 through the OV 164A and with the condenser 160 through the OV 164B; the adsorption chamber 150 communicates with the evaporator 130 through the OV 164C and with the condenser 160 through the OV 164D; and the desorption chamber 140 and the adsorption chamber 150 are connected with each other through the TV 166 which allowed mass transfer between the two chambers when required.

In the operational sequence, water vapor begins its process from the evaporator 130, utilizing chilled water in and out to achieve a cooling effect. For the adsorption chamber 150, under the controlled operation of the OV 164C, water vapor is directed into the adsorption chamber 150 from the evaporator 130. Within the adsorption chamber 150, the vapor undergoes an adsorption process, facilitated by the use of cooling water in and out. For example, the adsorption chamber 150 incorporates an adsorbent, a relatively cool water supply, and a heat exchange mechanism to direct the heat absorbed by the adsorbent away from the adsorption chamber 150. The cool water supply helps maintain a sufficiently low water vapor pressure inside the adsorption chamber 150, allowing the migrated water vapor to adsorb on the surface of the adsorbent. This process results in a decrease in temperature and pressure within the adsorption chamber, leading to the adsorption of water vapor. During this operation, the OV 164D is controlled to keep close, cutting the communication between the adsorption chamber 150 and the condenser 160.

Meanwhile, under the controlled operation of the OV 164A and the 164B, the OV 164A is controlled to keep close so as to cut the communication between the evaporator 130 and the desorption chamber 140; while the OV 164A is controlled as being open. Within the desorption chamber 140, the vapor undergoes a desorption process, facilitated by the hot water in and out. With heat from a heat source 142 through a water circulation communicating with the desorption chamber 140, the vapor pressure of the adsorbent inside the desorption chamber 140 is increased to a sufficiently high level in which the water vapor desorbs from the surface of the adsorbent. Then under the controlled operation of the OV 164B, the water vapor is transferred to the condenser 160 which communicates with a cooling water supply such that water vapor from the desorption chamber 140 is converted into condensate (i.e., water).

The adsorption and desorption processes inside the two-bed adsorption-desorption section are transient, and the mass transfer rates will decrease with time. Consequently, the roles of the desorption chamber 140 and adsorption chamber 150 inter-change periodically as well as the supply of cool and hot water in a complete system cycle. In other words, the system operates intermittently. Because VD is an isothermal process, only mass transfer across the selective membrane 113 is considered. The only heat transfer in the low-pressure or vacuum section is due to the water vapor migrated from the process air and subsequently extracted to the adsorption chamber 150.

At least a portion of water collected from the condenser 160 through the two-bed adsorption-desorption section can be directed to the evaporator 130 via the MCV 122 and the expansion valve 162. The MCV 122 can be used to adjust the amount condensate to be fed into the evaporator 130 from the condenser 160. With suitable control of the two MCVs 120 and 122, the ratio of dehumidification to total cooling load could be adjusted further. Such the combination can be made for auxiliary cooling for the evaporator 130, and thus the water collected from the condenser 160 can be transferred to the evaporator 130 through the MCV 122 and the expansion valve 162 to cool a chilled liquid source running through the evaporator 130.

With the operation of the adsorption refrigeration cycle, low pressure is induced in both the vacuum side of the vacuum section 110 and the evaporator 130 of the IAdCVD 100, facilitating the extraction of water vapor from incoming moist air. Specifically, the selective membrane 113, exclusively allowing only water vapor to pass through, serves to segregate the vacuum section and the air stream in the feed side 111. As the pressure within the vacuum section (i.e., the low-pressure or vacuum side 112) sufficiently decreases, water vapor migrates from the air stream into the vacuum section. In the low-pressure environment of the adsorption chamber 150, supplied with cooling water, water vapor is drawn from moist air entering the feed side 111 to the low-pressure or vacuum side 112 through the selective membrane 113. Subsequently, this water vapor is directed into the evaporator 130, then into the adsorption chamber 150, and ultimately to the condenser 160. Concurrently, water vapor is released from the desorption chamber 140 to the condenser 160, facilitated by the supply of hot water. The introduction of cooling water to the condenser 160 ensures the condensation of water vapor, transforming it into liquid water, which is either drained from the condenser 160 or fed into the evaporator 130 for further cooling. This process effectively dehumidifies the moist air leaving the vacuum section 110.

The expanded water is converted to steam inside the evaporator by supplying a chilled water stream. In this way, the chilled water is cooled and can be supplied to radiant cooling system for air-conditioning. That is the condensed water in the condenser 160 can be directed to the evaporator 130 by passing through the MCV 122 and the expansion valve 162 in sequence, and the condensed water directed to the evaporator 130 enters the evaporator 130 via a first port different than a second port for connecting the evaporator 130 to the chilled water supply.

The heating power input ($\dot{Q}_{heat}$) of the IAdCVD 100 is given by $$\dot{Q}_{heat} = \dot{m}_{hw} c_{p,w} (T_{hw,i} - T_{hwo}) \quad (1)$$

The cooling capacity ($\dot{Q}_{cool}$) of the IAdCVD 100 is given by $$\dot{Q}_{cool} = \dot{m}_{chw} c_{p,w} (T_{chw,i} - T_{chw,o}) + \dot{m}_{da} (h_{ai} - h_{ao}) \quad (2)$$

The average cooling capacity (CAP) is calculated by averaging over a complete system cycle as given by $$CAP = \frac{\int_0^{t_{cycle}} \dot{Q}_{cool} dt}{t_{cycle}} \quad (3)$$

while the overall system performance is represented by the COP as given below:

$$COP = \frac{\int_0^{t_{cycle}} \dot{Q}_{cool} dt}{\int_0^{t_{cycle}} \dot{Q}_{heat} dt} \quad (4)$$

The complete adsorption refrigeration cycle comprises different combinations of operating modes, namely preheating/cooling (PHC), adsorption/desorption (AdDe), heat recovery (HR), mass recovery (MR) as well as heat and mass recovery (HMR). Hence, the performance of the IAdCVD under the various cycle sequences would be compared in terms of the system capacity and COP. In one embodiment, the feed air flow rate is taken as 0.018 m³/s at an entering condition of 33° C., and 67% RH. The selection of the membrane area in combination with the feed air flow rate is based on similar condenser and evaporator pressures when the IAdCVD is operated as purely an AdC and an AdVD under the AdDe mode only. A parametric study would be conducted to investigate the effect of various operating conditions on the performance of the IAdCVD.

Table 3 compares the performances of the IAdCVD at two extreme situations which correspond to those of the AdC and AdVD under different cycle sequences. It could be found that the performances of the AdVD are slightly better than those of the AdC in terms of both cooling capacity and COP. The inclusion of HR appears to have more impact on the system COP, while the MR affect the cooling capacity more. The complete use of PHC and HMR could improve the cooling capacity and COP by at most 15 and 52% respectively as compared to those with only AdDe in operation.

TABLE 3

Summarized performances of the IAdCVD at different cycle sequences.

| Cycle sequence | AdC CAP (kW)/COP | AdVD CAP (kW)/COP |
|---|---|---|
| AdDe | 0.535/0.189 | 0.597/0.208 |
| PHC + AdDe | 0.587/0.213 | 0.619/0.225 |
| PHC + AdDe + HR | 0.586/0.268 | 0.614/0.282 |
| PHC + AdDe + MR | 0.596/0.221 | 0.622/0.231 |
| PHC + AdDe + HMR | 0.615/0.288 | 0.626/0.296 |

Figure 3:
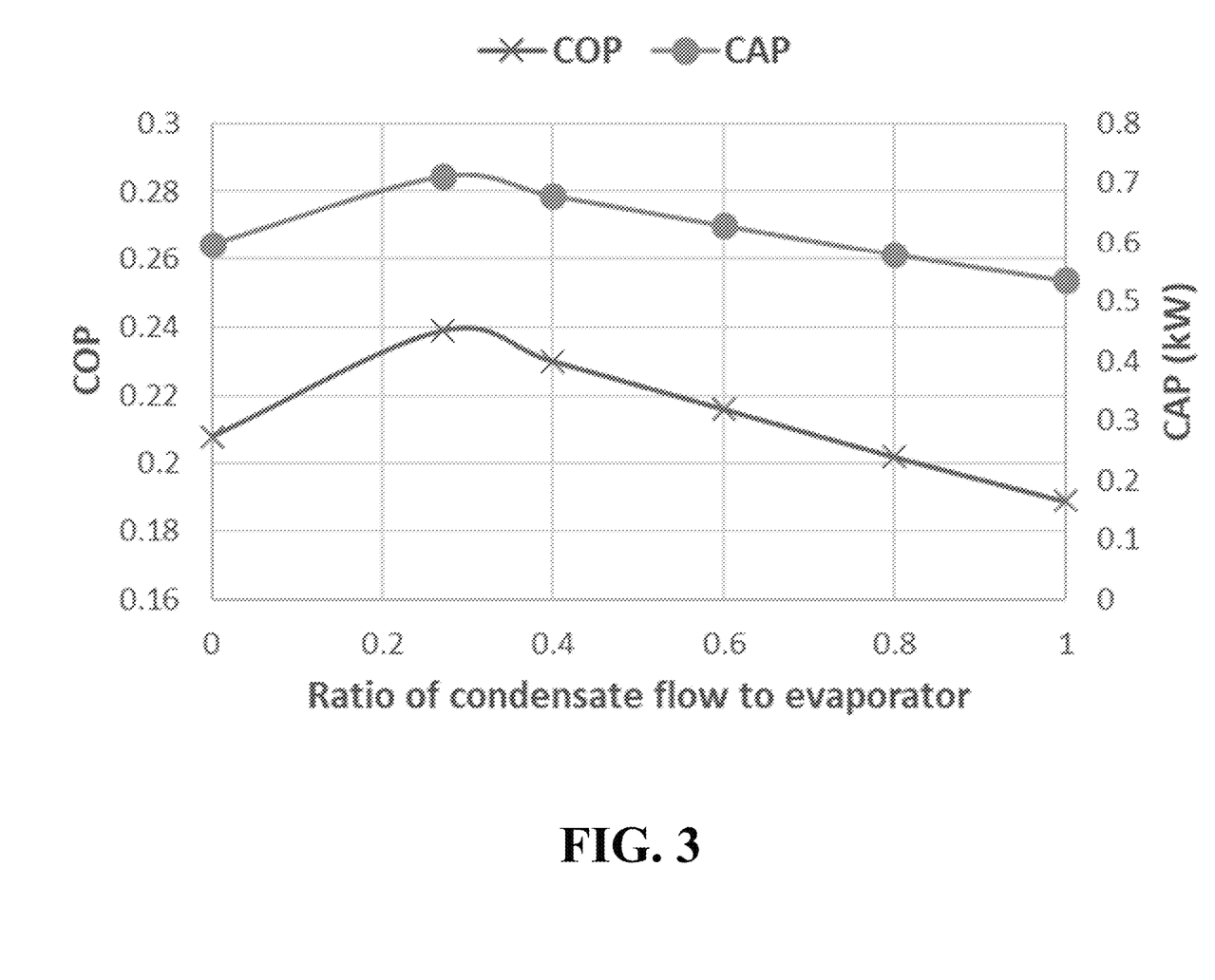
FIG. 3 shows a graph for performance of an integrated adsorption cooling and vacuum dehumidification system using the basic cycle sequence according to one embodiment of the present invention.
Figure 4:
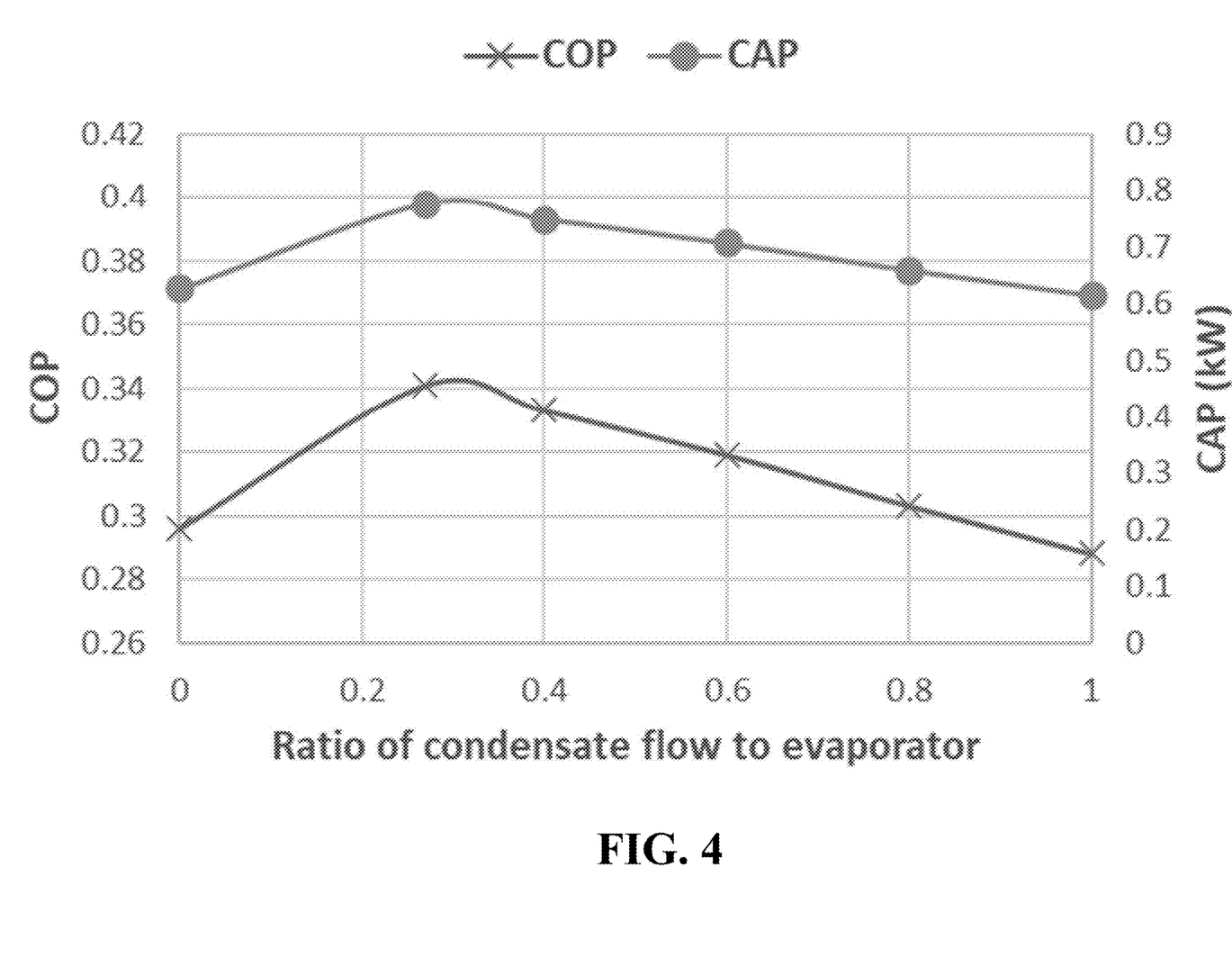
FIG. 4 shows a graph for performance of an integrated adsorption cooling and vacuum dehumidification system using the complete cycle sequence according to one embodiment of the present invention.

FIG. 3 and FIG. 4 depict the variation of the performances of the IAdCVD with the ratio of the condensate flow to evaporator ($\beta$) under the basic (AdDe) and complete (PHC+AdDe+HMR) cycle sequences. It could be found that an optimal value of around 0.3 for $\beta$ occurred in which both the CAP and COP reached the maximum which measured at most 33 and 26% higher as compared to that of an AdC.

Figure 5:
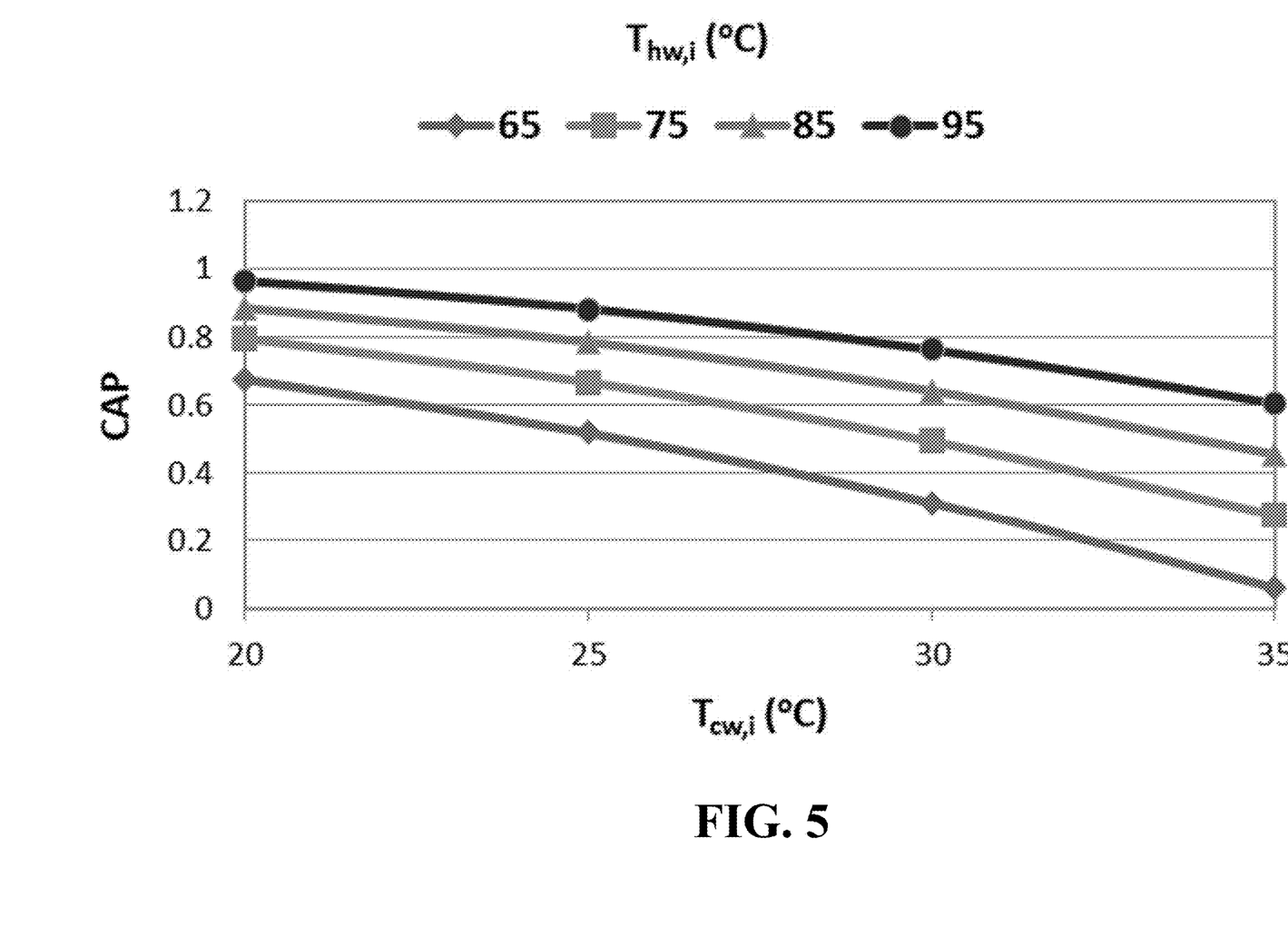
FIG. 5 shows a graph for variation of cooling capacities of an integrated adsorption cooling and vacuum dehumidification system with a cooling water supply temperature under different hot water supply temperatures based on 50% of condensate flow to evaporator according to one embodiment of the present invention.
Figure 6:
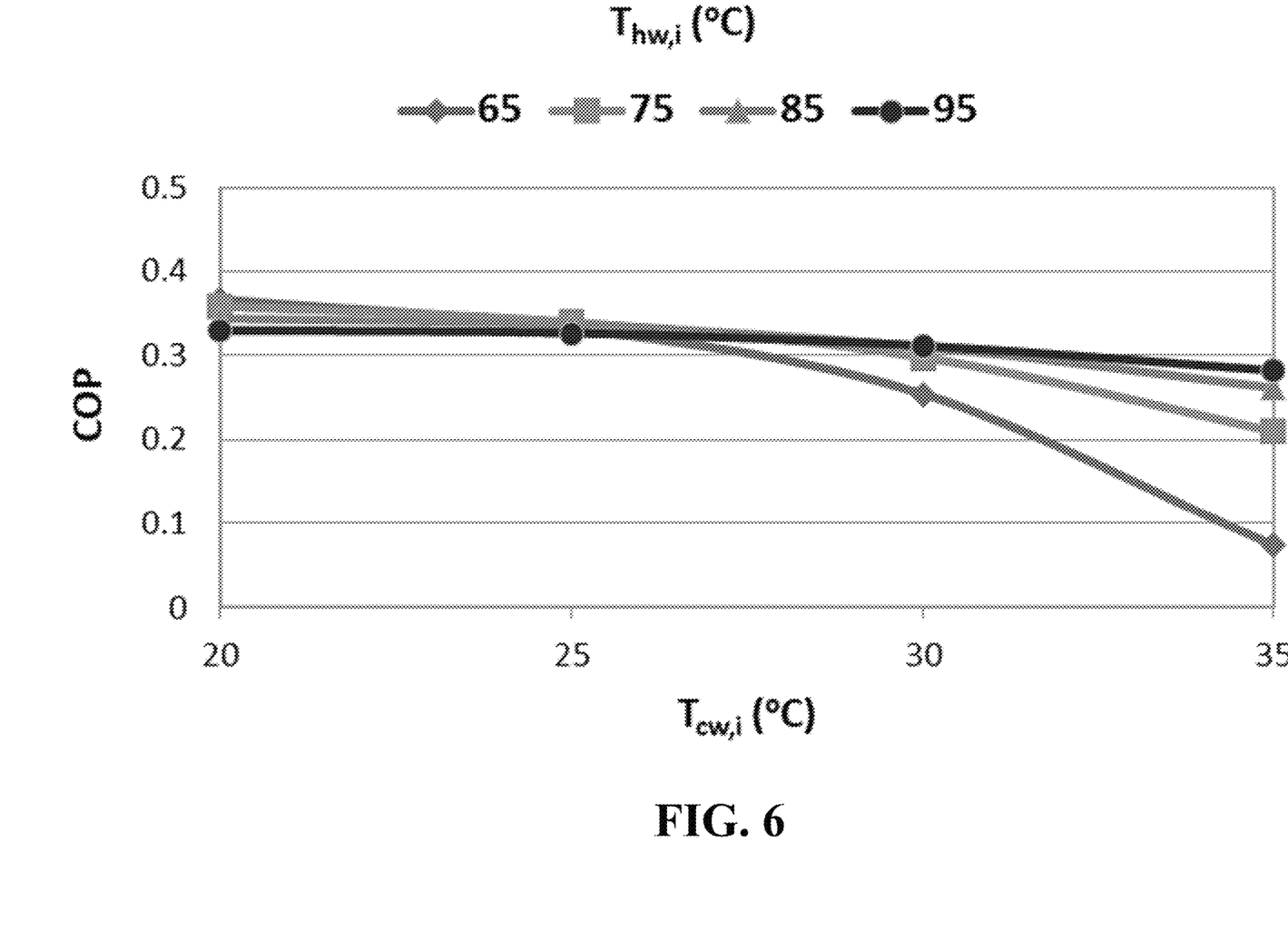
FIG. 6 shows a graph for variation of COP of an integrated adsorption cooling and vacuum dehumidification system with a cooling water supply temperature under different hot water supply temperatures based on 50% of condensate flow to evaporator according to one embodiment of the present invention.

Regarding sensitivity analysis of the IAdCVD performances under different operating conditions, FIG. 5 and FIG. 6 show the variation of the system cooling capacity and COP of the IAdCVD with the cooling water supply temperature under different hot water supply temperatures when $\beta$=0.5. The trends for the cooling capacities as indicated in FIG. 5 are close to those of an adsorption chiller in which the cooling capacity decreases with an increase in the cooling water supply temperature or decrease in hot water supply temperature.

However, the trends for the COP's shown in FIG. 6 appears to be slightly different from those of an adsorption chiller. When the cooling water supply temperature is 20° C., the COP increased slightly with a decrease in the hot water supply temperature. This could be explained by the fact that the heat input increases at a higher rate than the cooling capacity with an increase in the hot water supply temperature when the cooling water supply temperature is low. The situation changes substantially when the cooling water supply temperature is higher. In this case, the COP is with an increase in the hot water supply temperature.

So far in the above analysis, the IAdCVD provides normal chilled water for cooling which also handles some latent load through the cooling coil. In case of a radiant cooling system, a high-temperature chilled water should be provided. Moreover, the radiant cooling equipment usually could only allow a smaller temperature rise for the chilled water. To suit this application, the chilled water flow is increased to 0.085 kg/s. Meanwhile, the air flow is reduced to 0.005 m³/s so that the humidity level of the dehumidified air could reach the requirement for a radiant cooling system in a tropical/sub-tropical region.

Figure 7:
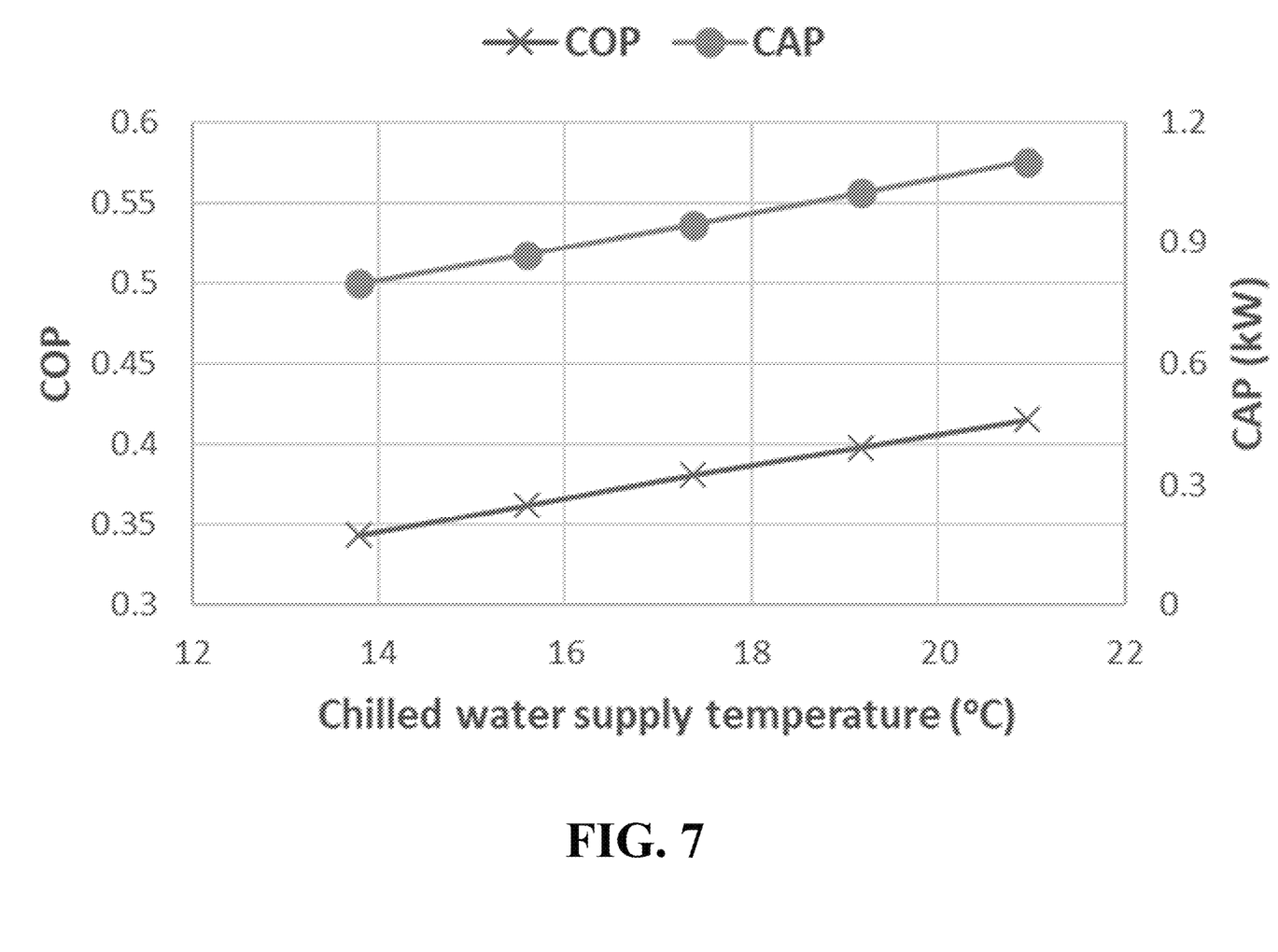
FIG. 7 shows a graph for performance of an integrated adsorption cooling and vacuum dehumidification system for radiant cooling using the complete cycle sequence and 86% of condensate flow to evaporator according to one embodiment of the present invention.

FIG. 7 shows the system performance at different chilled water supply temperatures by using the complete cycle and $\beta$=0.86. The system performance is better with an increase in the chilled water supply temperature. With a chilled water supply temperature of around 21° C., the respective cooling capacity and COP is 79% and 44% higher than that of an AdC. This highlights the strength of the present integrated design as a sustainable and energy-efficient alternative to conventional vapor-compression air-conditioning systems for carbon neutrality.

With further development of new adsorbent like zeolite and metal organic framework, it can be expected that the merit of applying the proposed system will be further enhanced.

As discussed above, in the present disclosure, a novel heat-driven integrated adsorption cooling and vacuum dehumidification system (IAdCVD) is provided, in which a vacuum section is connected to the evaporator of an adsorption chiller (AdC) to provide both cooling and dehumidification. Water vapor from the moist feed air is extracted to the evaporator through a selective membrane inside the vacuum section due to the water vapor pressure difference on both sides of the membrane. It is found that the complete use of pre-heating/cooling with heat and mass recovery offers the best system performance in the cooling capacity and coefficient of performance (COP). An optimal ratio of condensate flow from condenser to evaporator (β) is found which measured around 0.3 when the system performance is the highest. The respective cooling capacity and COP are 33 and 26% higher than those of an AdC.

Figure 8:
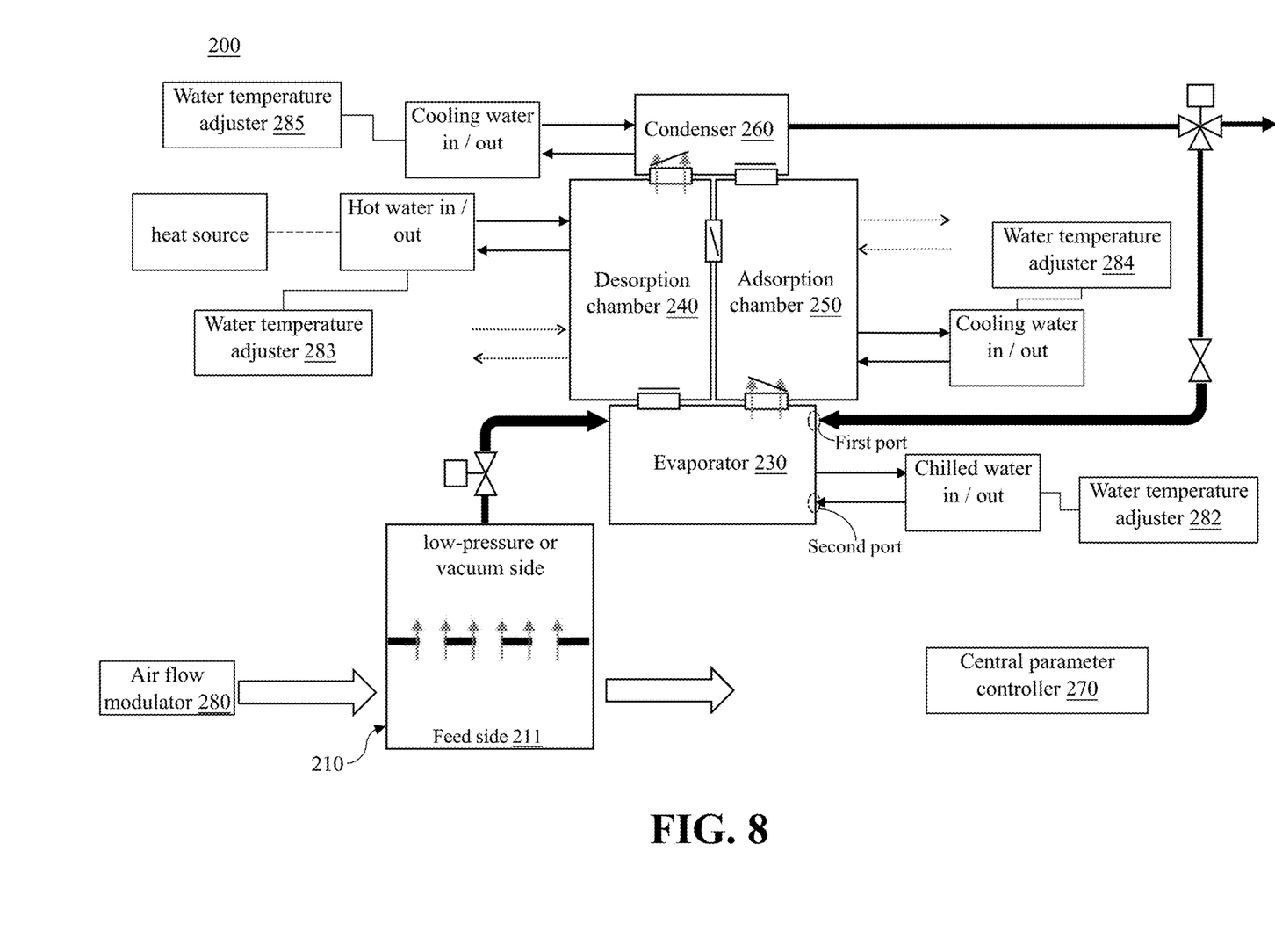
FIG. 8 shows a schematic diagram of an integrated adsorption cooling and vacuum dehumidification system according to one embodiment of the present invention.

To make the IAdCVD further comply with the expected performance as afore-described, another embodiment is provided, referring to FIG. 8 which shows a schematic diagram of a IAdCVD 200 according to one embodiment of the present invention. The IAdCVD 200 include a configuration similar with to that of FIG. 2, except that the IAdCVD 200 further includes a central parameter controller 270, an air flow modulator 280, and water temperature adjusters 282, 283, 284, 285. The central parameter controller 270 can be electrically coupled with the air flow modulator 280 and the water temperature adjusters 282, 283, 284, 285 to control the applied parameters and make them as expected for desired system performance.

The air flow modulator 280 is connected with the feed side 211 of the vacuum section 210 for controlling parameters of the incoming airflow, such as flow rate. It can also provide real-time temperature feedback to the central parameter controller 270. In one embodiment, as indicated by the central parameter controller 270 and modulated by the air flow modulator 280, a feed air flow rate of an air flow entering the feed side 211 is taken as a range between 0.015 and 0.02 m$^3$/s (e.g., 0.018 m$^3$/s). Further, the air flow entering the feed side 211 can be controlled by the e air flow modulator 280 to be at a temperature in a range between 30° C. and 35° C. (e.g., 33° C.) and 60%-70% RH (e.g., 67% RH)

The water temperature adjusters 282, 283, 284, 285 are connected to a chilled water supply for the evaporator 230, a hot water supply for the desorption chamber 240, a cooling water supply for the adsorption chamber 250, and a cooling water supply for the condenser 260, respectively. In one embodiment, as indicated by the central parameter controller 270, the water temperature adjuster 282 is configured to control the chilled water supply to provide chilled water at a temperature in a range from 18° C. to 23° C. (e.g., 21° C.). In one embodiment, as indicated by the central parameter controller 270, the water temperature adjuster 284 is configured to control the cooling water supply to provide cooling water at a temperature in a range from 25° C. to 35° C. (e.g., 30° C.).

The functional units of the apparatuses and the methods in accordance with the embodiments disclosed herein may be implemented using electronic devices, computer processors, or electronic circuitries including but not limited to application specific integrated circuits (ASIC), field programmable gate arrays (FPGA), and other programmable logic devices configured or programmed according to the teachings of the present disclosure. Machine instructions running in the electronic devices, computer processors, or programmable logic devices can readily be prepared by practitioners skilled in the software or electronic art based on the teachings.

All or portions of the methods in accordance to the embodiments may be executed in one or more electronic devices including server computers, personal computers, laptop computers, mobile computing devices such as smartphones and tablet computers.

The embodiments include computer storage media having machine instructions stored therein which can be used to configure hardware devices to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units in accordance to various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium and technologies.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

Nomenclature:
  CAP cooling capacity (kW)
  COP coefficient of performance
  $c_p$ specific heat capacity at constant pressure (kJ/kg K)
  h specific enthalpy (kJ/kg)
  ṁ mass flow rate (kg/s)
  Q̇ thermal power (kW)
  T temperature (K)
  1 time (s)
  β ratio of condensate flow from condenser to evaporator
Subscript
  ai air inlet
  ao air outlet
  chw chilled water
  cool cooling
  cycle complete adsorption cycle
  da dry air
  heat heating
  hw hot water
  i inlet
  o outlet
  W water

ABBREVIATIONS

AdC adsorption chiller
  AdDe adsorption/desorption
  AdVD adsorption vacuum dehumidification
  db dry bulb temperature
  HR heat recovery HMR heat and mass recovery
IAdCVD Integrated adsorption cooling and vacuum dehumidification
MR mass recovery
PHC pre-heating/cooling
RH relative humidity
VD vacuum dehumidification

What is claimed is:

1. An integrated adsorption cooling and vacuum dehumidification system, comprising:
    a vacuum section comprising a selective membrane separating the vacuum section into a feed side and a low-pressure side, wherein the feed section is disposed in contact with an air flow which flows into the vacuum section;
    an evaporator connected to the low-pressure side of the vacuum section and having a lower water vapor pressure than that of the feed side such that a water vapor pressure difference is established across the selective membrane, wherein the evaporator communicates with a chilled water supply;
    an adsorption chamber communicating with the evaporator and a cooling water supply, wherein the adsorption chamber comprises at least one adsorbent and supplied with a cooling agent from the cooling water supply to keep the water vapor pressure of the adsorbent below that of the evaporator so that moisture from the air flow passing through the selective membrane is extracted from the evaporator to the adsorption chamber;
    a condenser;
    a desorption chamber communicating with the condenser and with a hot water supply which is connected to a hot source, wherein the hot water supply is configured to provide heating agent to the desorption chamber to keep vapor pressure of an adsorbent in the desorption chamber higher than that of the condenser so that adsorbed water in the adsorbent in the desorption chamber migrates from the desorption chamber into the condenser, wherein the condenser communicates with a cooling source and is configured to convert the water vapor migrated from the desorption chamber into a condensed water; and
    a motorized control valve (MCV) and an expansion valve coupled between the condenser and the evaporator, wherein the condensed water in the condenser is directed to the evaporator by passing through the MCV and the expansion valve in sequence, and the condensed water directed to the evaporator enters the evaporator via a first port different from a second port for connecting the evaporator to the chilled water supply.

2. The integrated adsorption cooling and vacuum dehumidification system according claim 1, further comprising a central parameter controller that is electrically coupled to the cooling water supply for the adsorption chamber, wherein the central parameter controller is configured to control the cooling water supply to provide cooling water at a temperature in a range from 25° C. to 35° C. for the adsorption chamber.

3. The integrated adsorption cooling and vacuum dehumidification system according claim 2, wherein the central parameter controller is configured to control the cooling water supply to provide cooling water at the temperature of 30° C. for the adsorption chamber.

4. The integrated adsorption cooling and vacuum dehumidification system according claim 1, further comprising a central parameter controller that is electrically coupled to the cooling water supply for the adsorption chamber, wherein the central parameter controller is configured to control the chilled water supply to provide chilled water at a temperature in a range from 18° C. to 23° C. for the evaporator.

5. The integrated adsorption cooling and vacuum dehumidification system according claim 4, wherein the central parameter controller is configured to control the chilled water supply to provide chilled water at the temperature of 21° C. for the evaporator.

6. The integrated adsorption cooling and vacuum dehumidification system according claim 1, further comprising:
    an air flow modulator connected with the feed side of the vacuum section; and
    a central parameter controller electrically coupled to the air flow modulator.

7. The integrated adsorption cooling and vacuum dehumidification system according claim 6, wherein the central parameter controller is configured to control the air flow modulator to adjust the air flow entering the feed side with a feed air flow rate in a range between 0.015 and 0.02 m3/s.

8. The integrated adsorption cooling and vacuum dehumidification system according claim 7, wherein the central parameter controller is configured to control the air flow modulator to adjust the air flow entering the feed side with a feed air flow rate at 0.018 m$^3$/s.

9. The integrated adsorption cooling and vacuum dehumidification system according claim 1, wherein the selective membrane is configured to exclusively allow only water vapor to pass through, such that moisture from the air flow is extracted from the feed side into the low-pressure side in an isothermal manner.

10. The integrated adsorption cooling and vacuum dehumidification system according claim 1, wherein a portion of condensed water from the condenser is directed to the evaporator via an expansion valve, and the amount of the condensed water is adjustable to provide auxiliary cooling for the evaporator and to control the ratio of moisture removal to total cooling load.

11. The integrated adsorption cooling and vacuum dehumidification system according claim 1, wherein the integrated adsorption cooling and vacuum dehumidification system is configured to provide high-temperature chilled water suitable for at least one radiant cooling system by adjusting the chilled water flow rate and air flow rate entering the vacuum section.

12. The integrated adsorption cooling and vacuum dehumidification system according claim 1, wherein the adsorption chamber and the desorption chamber operate in alternating cycles, such that during each cycle:
    (i) the adsorption chamber is supplied with cooling water to maintain a low water vapor pressure and receive vapor from the evaporator, and
    (ii) the desorption chamber is supplied with hot water to elevate the vapor pressure of the adsorbent and release vapor to the condenser,
    whereby the adsorption and desorption chambers periodically switch roles to sustain continuous dehumidification and cooling.

13. A method for using an integrated adsorption cooling and vacuum dehumidification system, the method comprising:
    providing a water vapor pressure difference to extract moisture from an air flow passing through a vacuum section which comprises a selective membrane separating the vacuum section into a feed side and a low-pressure side;

cooling an adsorption chamber communicating with an evaporator which communicates with the vacuum section, such that the moisture extracted from the feed side through the water-permeable hydrophilic membrane into the evaporator is adsorbed on a surface of an adsorbent of the adsorption chamber;

heating a desorption chamber communicating with a condenser to reach a temperature that drives water vapor to migrate into the condenser from the desorption chamber;

cooling the condenser communicating with the desorption chamber to a temperature to condense the water vapor migrated from the desorption chamber into the condenser;

directing condensed water in the condenser to the evaporator by passing through a MCV and an expansion valve in sequence, wherein the condensed water is directed to the evaporator via a first port, and the evaporator is chilled by a chilled water supply in which chilled water enters the evaporator via a second port different than the first port.

14. The method according claim 13, wherein the cooling the adsorption chamber is performed by providing cooling water at a temperature in a range from 25° C. to 35° C. for the adsorption chamber.

15. The method according claim 14, wherein the cooling the adsorption chamber is performed by providing the cooling water at the temperature of 30° C. for the adsorption chamber.

16. The method according claim 13, wherein the chilling the evaporator is performed by providing the chilled water at a temperature in a range from 18° C. to 23° C. for the evaporator.

17. The method according claim 16, wherein the chilling the evaporator is performed by providing the chilled water at the temperature of 21° C. for the evaporator.

18. The method according claim 13, further comprising:
adjusting the air flow entering the feed side with a feed air flow rate in a range between 0.015 and 0.02 m$^3$/s.

19. The method according claim 18, wherein the feed air flow rate is adjusted at 0.018 m$^3$/s.

* * * * *